United States Patent [19]
Cashman

[11] Patent Number: 5,819,184
[45] Date of Patent: Oct. 6, 1998

[54] PORTABLE COMMUNICATIONS AND DATA TERMINAL OPERATING TO OPTIMIZE RECEIPT OF BOTH INCOMING CDPD AND AMPS MESSAGES

[75] Inventor: Russell P. Cashman, Vista, Calif.

[73] Assignee: Pacific Communication Sciences, Inc., San Diego, Calif.

[21] Appl. No.: 496,282

[22] Filed: Jun. 28, 1995

Related U.S. Application Data

[63] Continuation-in-part of Ser. No. 487,043, Jun. 7, 1995.

[51] Int. Cl.[6] .................................................. H04Q 7/32
[52] U.S. Cl. ............................................................ 455/553
[58] Field of Search ...................... 379/59, 58; 370/94.1, 370/105.1, 95.1; 380/48; 455/553

[56] References Cited

U.S. PATENT DOCUMENTS

| | | | |
|---|---|---|---|
| 4,887,265 | 12/1989 | Felix | 370/94.1 |
| 5,119,502 | 6/1992 | Kallin et al. | |
| 5,144,668 | 9/1992 | Malek et al. | 380/48 |
| 5,363,428 | 11/1994 | Nagashima | |
| 5,509,016 | 4/1996 | Muller | |
| 5,517,505 | 5/1996 | Bochholz et al. | 370/105.1 |
| 5,533,019 | 7/1996 | Jayapalan | |
| 5,533,029 | 7/1996 | Gardner | |
| 5,539,748 | 7/1996 | Raith | 370/95.1 |
| 5,544,222 | 8/1996 | Robinson et al. | 379/58 |
| 5,544,225 | 8/1996 | Kennedy, III et al. | 379/59 |

FOREIGN PATENT DOCUMENTS

WO 95/07595  3/1995  WIPO .

*Primary Examiner*—William Cumming
*Attorney, Agent, or Firm*—Lowe, Price, LeBlanc & Becker; Steven A. Shaw

[57] ABSTRACT

A portable radio telephone handset operates as a data transfer terminal as well as an analog cellular telephone subscriber station. Two modes of operation, an analog cellular communication mode and a Cellular Digital Packet Data (CDPD) mode, are available in the handset. The handset distinguishes between paging signals indicating CDPD mode communications and those indicating analog cellular communications. The handset also automatically preempts CDPD communications in favor of analog cellular communications such as those carried out in an AMPS configuration. The handset maintains an active status on a CDPD communication channel during a "sleep mode", when the handset can carry out AMPS activity.

16 Claims, 6 Drawing Sheets

Figure 6

# PORTABLE COMMUNICATIONS AND DATA TERMINAL OPERATING TO OPTIMIZE RECEIPT OF BOTH INCOMING CDPD AND AMPS MESSAGES

RELATED APPLICATIONS

This is a continuation-in-part of application Ser. No. 08/487,043 filed Jun. 7, 1995.

TECHNICAL FIELD

This invention relates generally to wireless communication devices. More particularly, the invention relates to switching wireless portable subscriber stations between both data and voice modes.

BACKGROUND OF THE INVENTION

The modern analog cellular system for mobile wireless duplex voice transmission is called "Advanced Mobile Phone Service" (AMPS). The AMPS cellular network uses the FCC assigned carrier frequency range of 800 to 900 MHz. Automobile-mounted cellular units transmit voice signals to a cellular base station within a given cell using up to one watt of power. Hand-held cellular units using battery power supplies transmit voice signals to a cellular base station within a given cell using up to one quarter watt of transmission power.

The analog human voice was the signal that the AMPS system was first designed to communicate. The AMPS system was optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations whereby a user's signal is handed off to the next cell site as he or she moves into a different cell area. This cellular hand-off can cause a temporary loss in transmission or reception. However, temporarily losing a voice signal is not critical because a user knows when there is a signal loss and the voice information can be retransmitted. However, signal loss, even though temporary, poses special problems for transmission of digital data. Some other AMPS cellular problems causing loss in voice signals are drops in signal strength, reflections, Rayleigh fading, and cellular dead spots.

The availability of portable computers naturally led to the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage to using the AMPS system for data transmission is that a narrow channel bandwidth and errors in transmission limit the baud rate for transmitting and receiving the digital data. As previously stated, loss of raw digital data may be caused by other problems in the AMPS mobile cellular system.

Heretofore, providing efficient wireless communication of both voice and data signals in an integrated package has been difficult. Furthermore, it is difficult to integrate the features of AMPS voice transmission with applications such as data transmission, electronic mail, duplex paging, as well as the provision of a circuit-switched cellular data interface such as a wireless fax-modem, into a single hand-held battery operated wireless unit. This has been accomplished in part by the Cellular Digital Packet Data (CDPD) system described in the CDPD specification, Version 1.1, incorporated herein by reference as background material. The CDPD communication system shares the same carrier frequencies assigned to the AMPS channels as described in Part 405, Version 1.1 of the CDPD specification.

Figure 1:
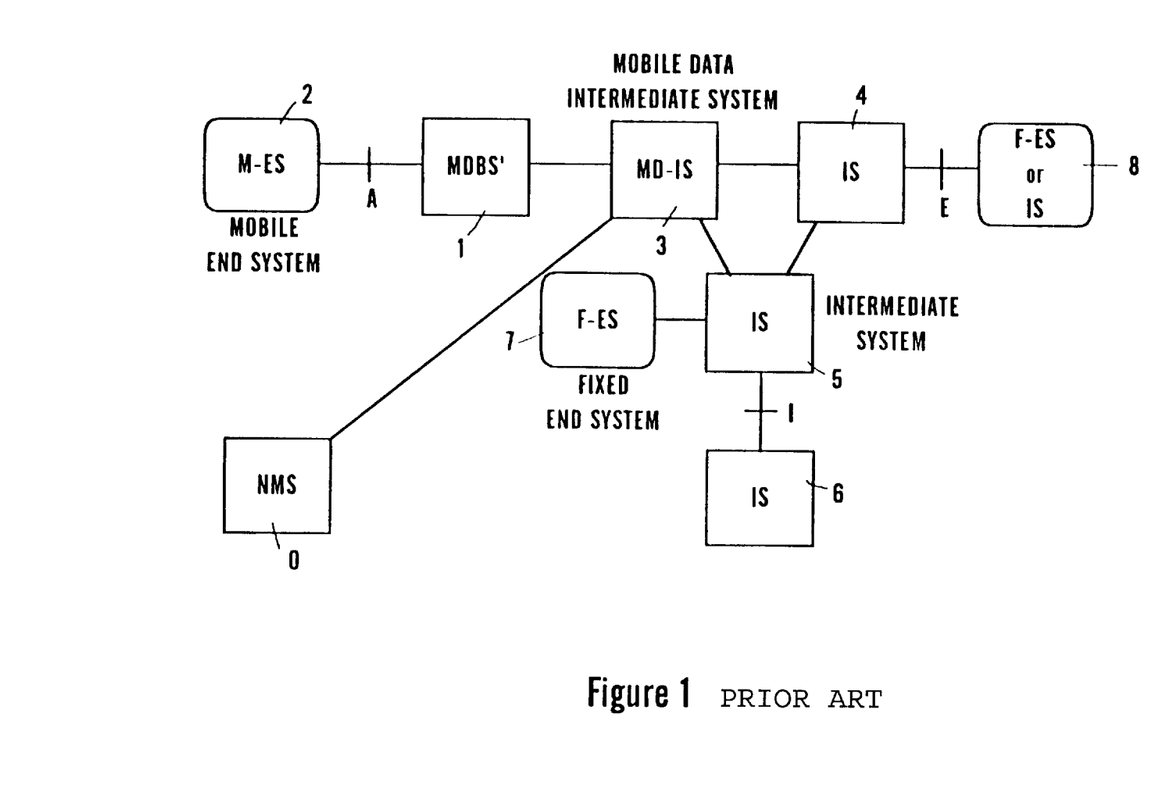
FIG. 1 is a block diagram of a CDPD system.

The base unit or mobile data base station (MDBS 1, as illustrated in FIG. 1), of a CDPD system utilizes a channel within an AMPS cell to establish a link and communicate to a user's mobile end system. The MDBS may use other frequencies outside of AMPS that are made available to it by service providers. The mobile end system (M-ES 2) is a portable computer, hand-set or other portable electronic device containing a subscriber communication unit. The MDBS serves as a communication link between the user of the subscriber station M-ES 2 and a service provider's network of wire lines, microwave links, satellite links, AMPS cellular links, or other CDPD links (such as mobile data intermediate system MD-IS 3 and intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission being carried out via an omni-directional antenna, or the transmitter located at the edge of a cell and transmitted via a directional antenna to cover just a portion of the cell. This portion of the second type of cell is referred to as a sector. In typical configurations, the transmitters for several sectors are co-located. The area served by a set of cells has some area overlap so that a roaming mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the mobile end system 2 and the MDBS 1 is an "air interface" constituted by a radio frequency link using standard AMPS frequencies. The MDBS 1 is connected to other mobile data base stations through a mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one sub-network to another. The mobile data MD-IS 3 performs data packet routing based on knowledge of the current location of each mobile end system within the range of the mobile data base stations under the control of the MD-IS. The MD-IS is the only network entity that is "aware" of the location of any of the mobile end systems. However, under some circumstances (as defined by the CDPD specification, Version 1.1 incorporated herein as background material), particular mobile data base stations will keep track of behavior of specific subscriber stations. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. One advantage of the subject CDPD system is the capability of providing operating instructions to mobile data base stations from the NMS 10 through an MD-IS 3, or by a direct connection to the MDBS as is outlined in the detailed description of the MDBS architecture found in the CDPD specification, Version 1.1, Parts 402 and 403.

Figure 2:
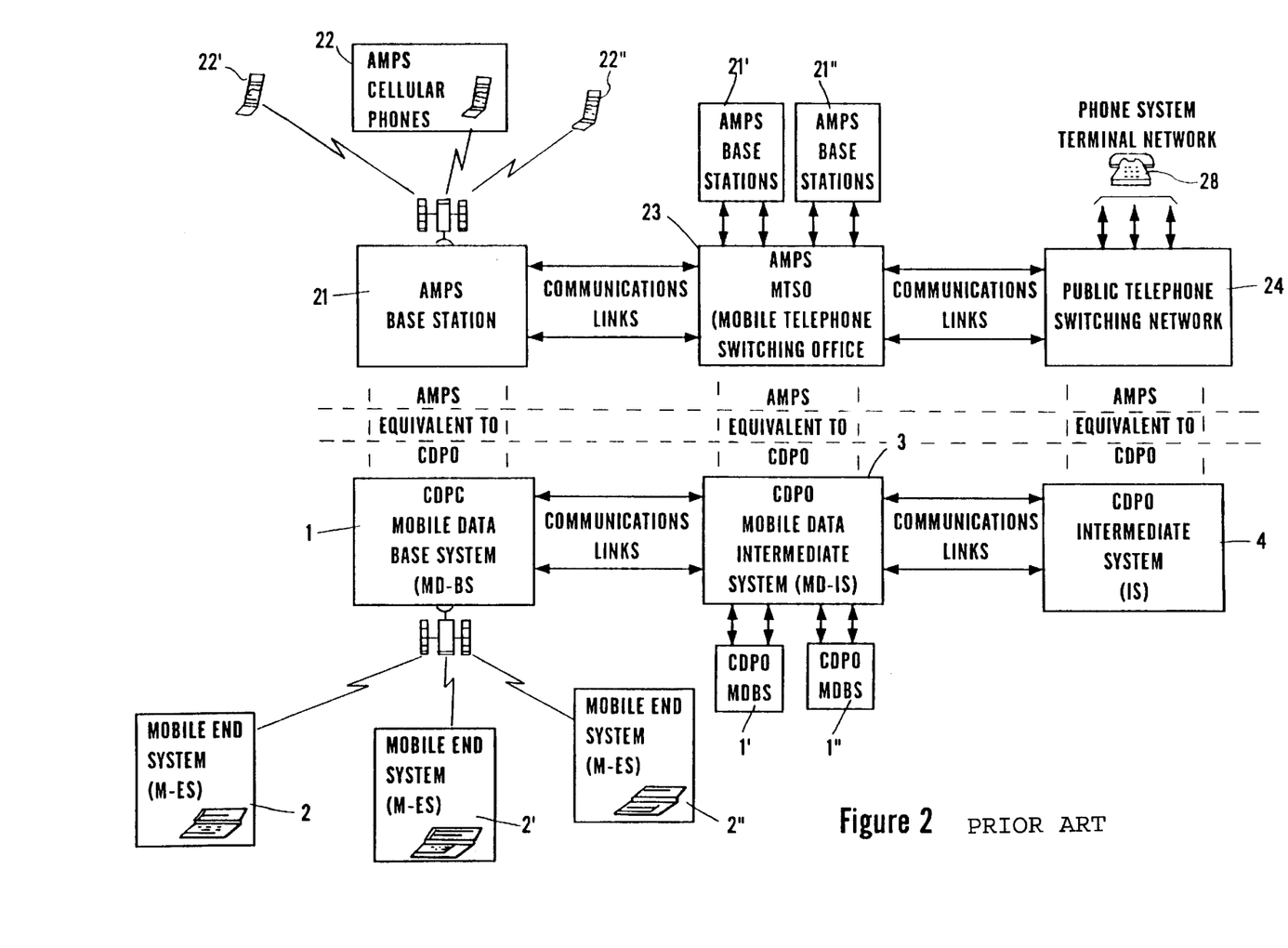
FIG. 2 is a block diagram correlating the CDPD system to an accompanying AMPS system.

FIG. 2 depicts a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22' and 22" for AMPS users. Both AMPS and CDPD functions can be handled by the same hand-set or end system equipment. Also, the MDBS 1 is preferably located with the AMPS base station 21 as will be explained in greater detail later.

The MD-IS 3 which acts as a local controller for the CDPD mobile data base stations connected thereto is equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is preferably located at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party through a PSTN 24. The intermediate system 4 of the CDPD corresponds to the use of the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber unit's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmission from the base station to the subscriber station M-ES are continuous. Transmissions from subscriber station M-ES to the MDBS use a burst mode in which subscriber station M-ES only accesses a channel when it has data to send and the channel is not being used by other mobile subscriber stations. This allows multiple mobile subscriber stations to share a single channel, and for data transmission characterized by intermittent transactions of relatively small amounts of data, thereby greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and very good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently the raw (baseband) digital data being transferred across CDPD include electronic mail messages, digital fax data, or digital data representing a network connection such that files may be transferred as if currently connected to a local area network.

The mobile data intermediate system MD-IS 3 handles the routing of packets for all visiting mobile end systems in its serving area. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and to detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, as stated above, AMPS calls are given first priority, and they are always able to preempt the use of any channel being used by CDPD. However, the cellular service provider may opt to dedicate one or more channels to CDPD usage. In this case, AMPS calls will never attempt to pre-empt the channels dedicated to CDPD use.

In a normal operation of the MDBS carrying out channel hopping, the MDBS functions the monitor activity on AMPS channels. The MDBS maintains a list of the status (occupied by voice or unused) for each channel available for CDPD use at the cell. The MDBS selects a channel for CDPD use from the unused channels in the list based on a combination of criteria (not specified in the CDPD standard). These could include such considerations as: the likelihood that the channel will be required by the voice system in the near future; the amount of interference present on the channel; the amount of interference that the CDPD communication is likely to cause to other voice users in different cells, or on other sectors; or, other factors. The MDBS transmits a list of all channels available for CDPD use (whether currently occupied by a voice communication or not) to the subscriber stations. The MDBS may execute a channel hop before the channel is pre-empted by AMPS communication if the MDBS determines that another channel is more suitable. In such a case, the MDBS sends a message to the subscriber stations commanding them to change to the specific channel selected, and then the MDBS executes the hop. This sort of hop is much more orderly and efficient than an unplanned hop since the subscriber stations do not have to search for the next channel.

If the present CDPD channel is pre-empted by AMPS communication, the MDBS selects another channel from those unused by AMPS communications and immediately hops to it without informing the subscriber station (an unplanned hop). The subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability, the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system, RF power amplifiers (in particular, linear amplifiers can be shared with existing AMPS), RF multicouplers, power splitters, duplexers, and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

The use of an effective CDPD system has brought about a problem in that a subscriber station must attempt to monitor for incoming calls on both CDPD and AMPS communication systems. If the subscriber station adheres to the timing of the CDPD system, it is likely that some incoming AMPS communications will be ignored, despite the pre-emption given to AMPS communications over CDPD communications. And while priority can be given to monitoring for AMPS communications, it is probable that CDPD communications directed to a subscriber station will be lost despite the fact that the CDPD system can buffer incoming paging signals for sleeping CDPD subscriber stations. Existing CDPD communication systems and existing AMPS communication systems fail to provide efficient monitoring of both modes of communications to prevent loss of incoming calls.

BRIEF SUMMARY OF THE INVENTION

One advantage of the invention resides in facilitating efficient switching between data communication and voice communication without loss of data communication where voice communication has priority.

A further advantage is in operating the wireless subscriber station in a manner minimizing loss of both incoming AMPS and CDPD communications.

Another advantage of the invention is in efficiently performing a hand-off operation of a wireless subscriber station in a CDPD communication system without losing incoming CDPD or AMPS calls.

These and other advantages of the invention are achieved by a subscriber station arranged for communication with an analog cellular voice communication system and a CDPD communication system, where the subscriber station is operated to appear to the CDPD system as if the subscriber station was in the CDPD mode while the subscriber station actually operated in the AMPS mode of communication. In effect, the subscriber station deceives the CDPD system into recognizing that the subscriber station remains in the CDPD sleep mode to avoid de-registration with the CDPD system when the subscriber station actually enters the AMPS mode of communication.

In accordance with one aspect of the present invention, a subscriber station is arranged for communication with a first communication system and a CDPD communication system, where the CDPD system includes first time adjustment means for selecting a first time interval between consecutive CDPD paging messages sent from the CDPD communication system to the wireless subscriber station. The wireless subscriber station includes means for requesting communication on the first communication system and means for requesting communication on the CDPD communication system. The subscriber station also has a second time adjusting means for selecting a second time interval starting at a most recent CDPD communication and ending when the wireless subscriber station is expected to enter a CDPD sleep mode. The subscriber station also includes means synchronizing the first and second time intervals to determine respective CDPD and first communication system operation schedules. The wireless subscriber station then uses means for selecting operation on the first communication system during the second time interval.

As another aspect of the invention, the subscriber station operates to appear to be in the CDPD sleep mode while actually in the AMPS mode by switching back and forth between the CDPD mode and the AMPS mode timed on the basis of both the AMPS paging cycle and the CDPD TEI notification cycle.

This operation is facilitated by a wireless subscriber station arranged for communication with a first communication system and a CDPD communication system where the CDPD communication system includes first timer means for measuring a first time interval specifying the time between consecutive CDPD paging messages sent from the CDPD communication system to the wireless subscribe station. The CDPD communication system also includes second timer means for measuring a second time interval specifying the time between a CDPD system response to a polling signal from the subscriber station and expected entry of the subscriber station into a CDPD sleep mode. The subscriber station includes means for requesting communication on the first communication system and on the CDPD communication system, means for measuring the first and second time intervals, and means for synchronizing the duration of the first and second time intervals with the CDPD communication system. The wireless subscriber station also includes means for determining respective CDPD and first communication operation schedules for the subscriber station based upon the first and second time intervals and a paging cycle of the first communication system. Also included are means for selecting operation of one or the other of the means for requesting communication based upon the operating schedules to scan for incoming paging signals on the first communication system while continuing to be registered on the CDPD system.

In accord with a further aspect of the invention, a method for communicating between a wireless subscriber station and both an analog cellular voice communication system and a CDPD communication system provides a subscriber station arranged to monitor both incoming analog cellular voice communications and incoming CDPD communications. The method includes the steps of registering the subscriber station with an analog cellular voice communication system and CDPD system. The CDPD registration system includes synchronizing a first time interval between the subscriber station and the CDPD system where the first time interval defines when the subscriber station is expected to be on the CDPD channel. In the next step of the CDPD registration, the subscriber station is switched from the CDPD channel to an analog cellular voice communication control channel to monitor for incoming analog cellular voice communications directed to the subscriber station. In final step, the subscriber station is switched back to the CDPD channel before the end of the first time interval.

As yet another aspect of the invention, a method for operating a wireless subscriber station in a CDPD system includes selecting at the wireless subscriber station a first time interval beginning at the completion of the most previous CDPD communication between a subscriber station and a CDPD system and ending when the subscriber station is expected to enter a CDPD sleep mode. The wireless subscriber station synchronizes with the CDPD communication system so that the subscriber station, along with the CDPD system, measures a plurality of second time intervals, wherein the second time intervals selected by the CDPD system define a duration of time allowed to the subscriber station before registration. The subscriber station monitors for incoming paging signals on a second communication system channel during the first time interval. Then, the subscriber station also monitors for incoming second communication system on for a plurality of second time intervals. Finally, the subscriber station changes modes to monitor for incoming CDPD communications on the CDPD channel before expiration of the last of the plurality of second time intervals.

In a still further aspect of the invention, the objects are achieved by a method of effecting handoff of a wireless subscriber station from a first cell to a second cell of a CDPD communication system is performed. A subscriber station contains a cell transfer database pertaining to the first cell, and registers in the second cell of the CDPD system by sending a polling receiver ready (RR) signal to a MDBS of the second cell. The subscriber station determines a first time interval for a complete Received Signal Strength Indication (RSSI) scan of the second cell. The subscriber station divides the first time interval into a plurality of overlapping sequential time slots. The subscriber station then alternately scans for CDPD activity and analog cellular voice communication activity on alternating time slots for the duration of the first time interval. The information derived from this scanning creates a second cell transfer database for the second cell. Once this second cell transfer database has been obtained, the first cell transfer database is discarded.

Yet another aspect of the present invention is directed to a wireless subscriber station arranged for communication with a first communication system and a CDPD communication system. The wireless station includes means for requesting communication on the first communication system and means for requesting CDPD communication. The wireless subscriber station also includes means for operating on the first communication system while remaining registered on the CDPD communication system.

An additional aspect of the present invention is directed to a method for communicating between a wireless subscriber station and both a first communication system and a CDPD communication system. The method includes the steps of registering the wireless subscriber station with the first communication system and then registering the wireless system with the CDPD communication system. In the final step the subscriber station tunes to a control channel on the first communication system while still presumed by the CDPD communication system to be on the CDPD channel.

DETAILED DESCRIPTION OF THE PREFERRED EMBODIMENTS

Figure 3:
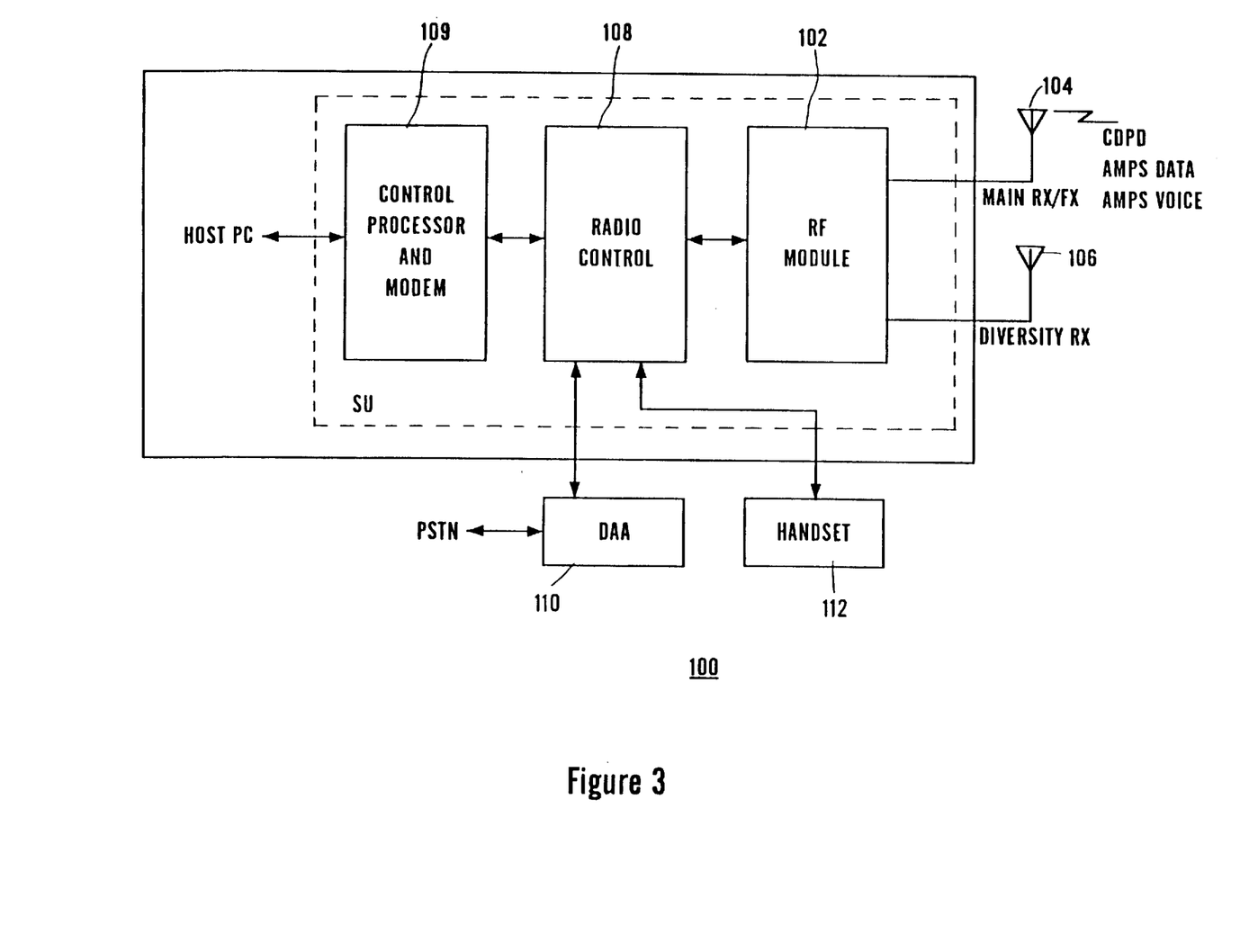
FIG. 3 is a block diagram of a portable radio telephone handset.

Achievement of the advantages of the present invention is facilitated by the device of FIG. 3. However, the device of FIG. 3 is not necessary to carry station having the capacity to operate in both the AMPS and CDPD modes of communication can be programmed to benefit from the operation of the present invention. Whatever type of handset or subscriber station is used, it is programmed to take advantage of certain operations normally carried out between the handset and the CDPD system. These include but are not limited to cognizance by the handset of the timing (and synchronization therewith) of the various CDPD system operations such as notification messages that incoming data is waiting for a specific subscriber station. Requests for modification of certain parameters by the subscriber station are also utilized as part of the present invention. Modifications are not necessary to the MDBS or the MD-IS of the CDPD communication system.

Depicted in FIG. 3 is a block diagram of the portable communication terminal handset 100 of the present invention. In most respects this portable communication terminal is similar to conventional portable radio telephone handsets in that it includes a radio frequency module 102 having at least one radio frequency transceiver. The radio frequency transceiver uses a main antenna 104 for both receiving and transmitting the various types of signals handled by the portable terminal, such as AMPS data (circuit switched cellular data) communication, AMPS voice communication and CDPD communication. A diversity antenna 106 is used as a backup to maintain reception under certain adverse conditions. A telephone type handset 112 is used to facilitate AMPS voice communication.

The portable terminal can also be patched into a local public switch telephone network (PSTN) by way of a digital-analog access interface (DAA) connected to the radio control processor 108. This processor, along with control processor and modem 109, divides the various control functions of the portable terminal including call setup, high level protocol, low level protocol, power adjustment, modem operation and data transfer between an external host computer. To facilitate ease of subscriber use, the host computer can be a personal computer (PC) or personal digital assistant (PDA) or other electronic device. The connection hardware of the portable terminal is of a standard type normally used with PC external connectors.

Figure 4:
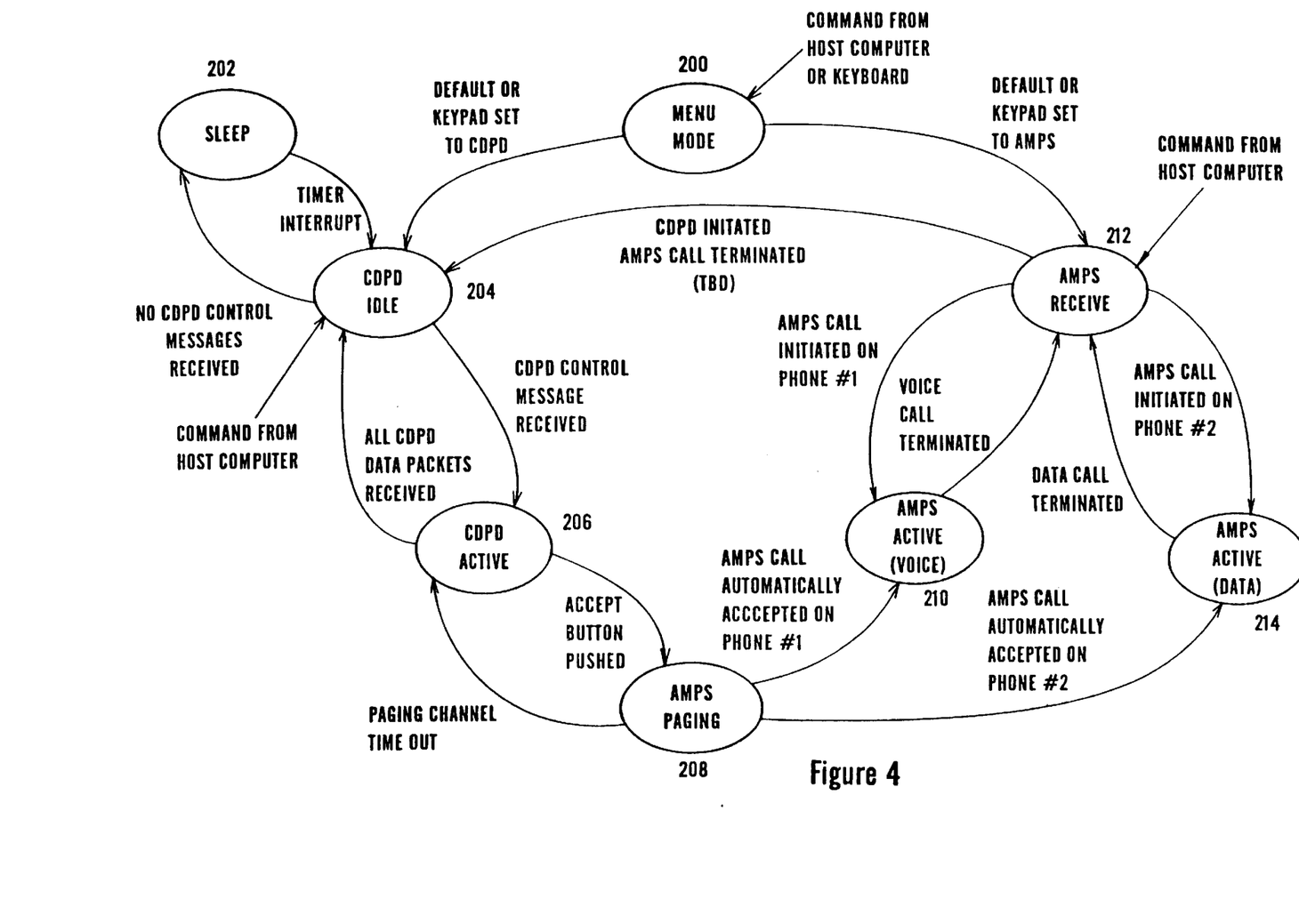
FIG. 4 is a representation of the operating modes available to the handset supporting the present invention when used in the appropriate CDPD communication system.

The portable data terminal handset and subscriber station as depicted in FIG. 3 can be configured to permit all the modes of operation illustrated in FIG. 4. The circle designated as 200 in FIG. 4 represents the menu mode selection by either the operator or programmer of the portable data terminal handset. Either of the two modes (AMPS or CDPD) can be selected by an operator using a key pad on the handset. If data is being entered into the portable terminal (handset) 100 by a host computer, either the mode or the predetermined default setting can be selected as part of that data transfer.

For best results, the illustrated system is normally in a low-power "sleep" mode as indicated at 202. This "sleep" or dormant mode results in the least amount of power expenditure. Normally, the "sleep" mode will be interrupted every 10–255 seconds to check for messages such as incoming paging signals. If none are received, the CDPD mode remains idle as indicated at 204. The CDPD can be rendered active as indicated at 206 by the receipt of a paging signal, a command from the host computer or the handset user to initiate data transfer in the CDPD mode. The advantage of remaining in the CDPD mode is that the battery is not heavily burdened so that, based on current battery technology, talk time at full transmission power is greater than 1 hour and standby time while monitoring the AMPS control channel is greater than 12 hours.

Sleep mode procedures are used to place the handset in the sleep mode referred to previously. The sleep mode is defined as an optional mode of operation that might be requested by a subscriber station M-ES during the data link establishment procedure (communication between the mobile end station and mobile data intermediate system). The sleep mode is intended to assist power conservation strategies in the mobile end station. The general operation of the sleep mode permits an M-ES to disable or power-down its receiver and associated circuitry. This mode is a key advantage of CDPD operation.

The sleep mode procedure operates in the "multiple frame established state". In this operation, if no frames are exchanged on the data link connection between a particular subscriber station M-ES and the MDBS after a period of time defined by the parameter T203, the data link connection may be placed in the Temporary Equipment Identifier (TEI) sleep state for the handset. While in this state, the overall network will not attempt to transmit information destined for that M-ES. If, after entering the sleep state, new frames become extant and waiting initial transmission, the network will broadcast a predetermined message at periodic intervals. This message contains a list of TEI's for which channel data is pending. The mobile end stations are expected to wake up at periodic intervals to determine if data from them is pending, and notify the network that they are willing to receive the pending data. Normally, the M-ES may exit the sleep state at any time.

Parameter T203 represents the maximum time allowed without frames being exchanged on the data link connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the subscriber radio receiver or other non-essential portions of its circuitry.

A second parameter, T204, represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Section 6.8.8 of Part 403 of the CDPD specification. The number of frames queued in the maximum time for which the network attempts to notify an M-ES in the TEI sleep state is implementation dependent. The network releases a data link connection and discards all queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number expressed as parameter N204 of successive TEI notification messages without a response from that M-ES. Consequently, the subject M-ES will be de-registered with the CDPD system.

A complete description of the aforementioned operation is found in Section 6.8 of Part 403 of the CDPD specification, incorporated herein by reference as background material. The parallel operation of the M-ES and the MD-IS is depicted in the parallel flow charts of FIG. 5. Both units recognize when the last CDPD communication by a particular subscriber at an M-ES took place. In this respect, both the M-ES and the MD-IS can be synchronized to each other. Using internal clocks, both units keep track of the time elapsed since elapse of the most recent CDPD communication between the M-ES and the MD-IS, as indicated at step 702. Thus, in operation according to this Part of the CDPD specification, if no data is sent in either direction over the air link for a certain length of time (parameter T203), the M-ES will go into the sleep mode and the network will assume that the M-ES is asleep, as indicated at step 703. Once the M-ES enters the sleep mode another timing operation is carried out in both the M-ES and the MD-IS.

Figure 5:
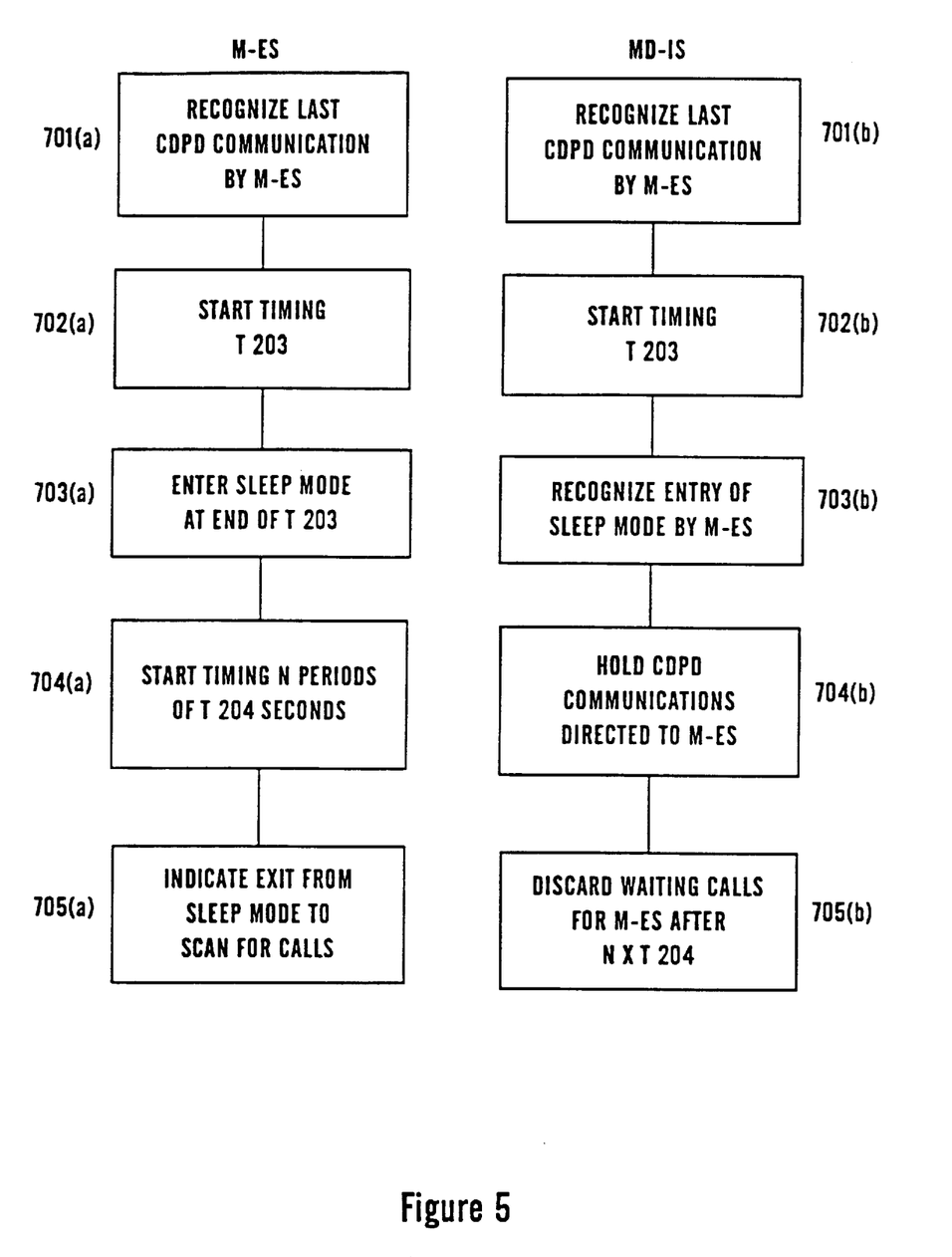
FIG. 5 is a flow chart depicting parallel operation for the handset and the Mobile Data Intermediate System (MD-IS) used to carry out the present invention.

The total length of this period is defined by the product of parameters T204 and N204, previously described. If the network has data to deliver to the M-ES that is believed to be asleep, the network will add the TEI for that M-ES to a list of sleeping units on a particular channel stream, that have data waiting for them. However, the network will not send that data (step 704). For each time frame measured by the parameter T204, the network will send a TEI indication for a particular subscriber unit M-ES indicating that there is data waiting for that subscriber station. Thus, the subscriber station will have to be monitoring the CDPD channel at some time during the time frame defined by T204 in order to determine if a message is waiting for that subscriber station.

The list of subscriber stations having waiting messages is broadcast to all units on that channel stream periodically in a TEI notification message. The time between such notification is specified by the parameter T204. This parameter determines the length of time the M-ES is expected to sleep before "waking" for its messages. When the M-ES awakens, it waits until it receives a notification message. If the TEI of that M-ES is on the list, it notifies the network that it is ready to receive data. If the TEI of a particular M-ES is not on that list, that M-ES goes back to sleep for another period of time, normally specified by the parameter T204. If a consecutive number of notifications (specified by the parameter N204) have been made for a TEI without the subject M-ES indicating that it is ready to receive data, the network will then assume that the M-ES is no longer present on the CDPD system and discards the data that was pending for that M-ES, as indicated at step 705. If the particular M-ES is handling normal AMPS communication for a greater amount of time than that encompassed by the product of parameters N204 and T204, then the data that is being held for that M-ES is discarded by the network. Thus, CDPD communication is lost due to the normal operation of AMPS communication.

Since AMPS mode operation is recognized as having preference over CDPD mode operation, the handset preferably spends most of its time monitoring for AMPS communication and just enough time in the CDPD mode to pick up indication of messages for a subscriber station and avoid de-registration. Consequently, one mode of operating subscriber station M-ES according to the present invention involves remaining in the AMPS mode monitoring an AMPS control channel while periodically breaking away to poll the CDPD network. When breaking away from the AMPS mode, the subscriber station M-ES sends a polling signal to the CDPD network to evoke a response and determine if there is any data waiting on the CDPD network for transmission to that subscriber station. After listening for an appropriate amount of time (usually T203) after the response for a return message from the CDPD network, the subscriber station then switches modes and tunes back to the AMPS channel. Preferably this switch-over occurs before any re-transmission of relevant AMPS pages that might have been missed while the subscriber station was in the CDPD mode.

The time frame during which the subscriber station must wait after sending the polling signal from the CDPD network is defined by parameter T203. This is the time that the CDPD network has to respond to the polling signal from the subscriber station to indicate that data is waiting for that subscriber station. If the subscriber station misses the waiting data by going back into the sleep mode, the subscriber unit may be de-registered from the CDPD network.

Once the M-ES has completed CDPD communication, it may appear to go into the sleep mode once again and the network may interpret the M-ES as being asleep again even if the M-ES functions once again in the AMPS mode. For such operation, different values are appropriate for the T203, T204 and N204 parameters than those values for an M-ES actually using the CDPD sleep mode in its intended power conservation function.

In practice, the aforementioned operation performs best if the value for the parameters T203 is smaller than that used for the CDPD sleep mode. Consequently, it does not take very long for the network to interpret the M-ES as being in the sleep mode. This is necessary to facilitate a quick response to incoming AMPS communications without losing registration on the CDPD network. The adjustment of the T203 parameter to accommodate the operation of a subscriber station M-ES is particularly important in light of the fact that it is common for many AMPS systems to repeat communication pages on the control channel once every 4–10 seconds. Consequently, it is desirable for a subscriber station to be subjected to a parameter T203 that permits the subscriber station to change modes and check the AMPS control channels in synchronization with the AMPS pages.

If parameter T203 is sufficiently large, the subscriber station M-ES shifts modes to monitor the AMPS control channels during the duration of the T203 time frame. Thus, there is a chance that an indication of incoming CDPD communication for that subscriber station will be lost during the sojourn on the AMPS communication channel. Also, there is a chance that the AMPS page may be missed during the change in the modes from AMPS to CDPD to scan for CDPD messages. Optimum operation requires a value of the T203 parameter based upon the operation of the AMPS paging system.

In the conventional operation of the CDPD system, the subscriber station M-ES cannot unilaterally control its own parameter T203 (the time after which the M-ES will go "to sleep" if no data is sent in either direction over the air link). The subscriber station must request a value of T203 from the CDPD system, and that value cannot be less than ten seconds. Also, the parameters T204 and N204 are not normally controlled by the M-ES in a CDPD network. Rather, control of these parameters resides within the network, in particular with the mobile data intermediate system to which a particular M-ES is currently assigned. Consequently, it is very difficult to coordinate the timing of the subscriber station so as to effectively monitor the AMPS control channel for a predominant amount of time while switching back to the CDPD channel only to receive critical paging messages. The necessary coordination of subscriber station operation to the AMPS paging cycle (repeated every 4–10 seconds) while still adhering to the requirements of the CDPD paging cycle is quite difficult.

This situation can be remedied by the operation of the first embodiment of the present invention. This includes a process of adjusting certain parameters such as T203 to help lead the CDPD network to "believe" that the M-ES is asleep, during which time the M-ES enters the AMPS mode (including tuning its radio to another channel, if necessary) and perform AMPS functions. Parameter adjustment is done by the subscriber station. After the AMPS scanning functions are complete, the M-ES re-enters the CDPD mode and notifies the CDPD network that it is ready to receive any data that had been pending (by virtue of the TEI of that M-ES being on the list of sleeping stations).

Referring to the arrangement depicted in FIG. 5, the subscriber station M-ES appears to enter the sleep mode at steps 703(a). However, rather than remaining in the CDPD sleep mode, the subscriber station switches modes and tunes to an AMPS control channel to monitor AMPS activity. The frequency at which the subscriber station M-ES checks for AMPS activity is based upon the frequency at which the AMPS system sends paging messages indicative of the desired AMPS communication to the subscriber stations.

Likewise, the parameter T204 can be adjusted to facilitate the most advantageous coordination between the CDPD and AMPS paging cycles. However, in order to carry out such coordination, it is necessary that the subscriber station synchronize its timing with that of the T204 parameter, as well as the T203 parameter. This is a critical attribute necessary for all embodiments of the present invention.

The adjustment of all of the T203, T204 and N204 parameters by the subscriber station is especially helpful in minimizing the time spent monitoring the CDPD channel, and maximizing the time spent monitoring the AMPS control channel. However, allowing these parameters to be adjusted by each subscriber station results in substantial control and coordination problems. Control of these parameters by the subscriber station M-ES on a practical basis would most likely be limited to control of the T203 parameter due to the limitations of the subscriber stations and the complexity of multiple T204 and N204 values throughout the area of control handled by any MD-IS.

Such control can be carried out by the M-ES, either manually or automatically. Automatic control can be carried out in response to the amount of AMPS usage experienced by a particular M-ES. Thus, the MD-IS does not have to configure its operation based upon generalized statistical analysis of AMPS versus CDPD usage of all user stations associated with an MD-IS serving the M-ES. Rather, parameter selection would be the responsibility of each M-ES. These parameters can be sent in any known manner convenient to the normal exchange of data between a mobile station and a base station.

However, the use of different values of T204 for each subscriber station could cause an undue control burden on the MD-IS controlling the CDPD system, or section thereof. While such control problems can be overcome by substantial hardware and software additions to the MD-IS controlling the CDPD system, such modification is not within the scope of the present invention. Nor is such operation within the realm of the current administrative environment controlling the operation of CDPD systems.

In accordance with Version 1.1 of the CDPD specification, Part 403, parameter T203 is set responsive to a request from the subscriber station M-ES by the CDPD system as controlled by the wireless data intermediate system MD-IS. If no request is made by the subscriber station, the CDPD system sets the T203 value by default to 30 seconds. To facilitate coordination with AMPS communication systems, the subscriber station requests the value for T203 to be set as low as possible. This minimum value allowed by the CDPD system is 10 seconds.

However, even this minimum value is too long to easily coordinate with the paging cycle of most AMPS communication systems. A lower value of T203 can be designated by a subscriber station. However, this value is limited to 0 seconds, and is indicative of the absence of the CDPD sleep mode. This would be impractical for a mobile subscriber station that is attempting to monitor both AMPS and CDPD paging signals at the same time.

Further, the parameter T204 is set up by the network and is not subject to variation by the individual subscriber units. A value between 20 and 250 seconds is common. Usually this parameter is approximately 1 minute. In the current CDPD administrative environment, subscriber stations do not make requests to alter the T204 parameter value. The T204 parameter is especially critical for the operation of the present invention since each subscriber station must be synchronized to the T204 timing for the MD-IS controlling that part of the CDPD system. While the CDPD specification does not require that the same synchronization be used for all cells controlled by particular MD-IS, it is reasonable to expect that this will be done in most cases in order to avoid de-synchronization with the TEI cycle (defined by the T204 parameter) when a mobile subscriber changes cells. This is critical since re-synchronization of the TEI cycle of the CDPD system can take between 30 and 300 seconds. During this time, a high risk of losing incoming AMPS communications would exist.

De-registration (requiring between 30 and 300 seconds to correct) or de-synchronization with the T204 timing would occur only if data was waiting for a particular subscriber station and that subscriber station did not answer pages for a time period defined by the product of the parameter N204 and the parameter T204.

The parameter N204 is not adjustable by the subscriber stations. However, subscriber stations are permitted to request variations in this parameter from the CDPD network. Parameter N204 is normally set at a value of five. However, values of four and six are also common.

In a typical communications environment, a subscriber station registers with a CDPD system and requests a T203 parameter of 10 seconds during the exchange of TEI messages and synchronization with the TEI timing (as well as the T203 timing). This process is described as the data link parameter exchange in Version 1.1 of the CDPD specification, Part 403, page 53, Table 403-8. In the typical AMPS environment accompanying the CDPD environment, AMPS paging signals are sent every 4–10 seconds. A conflict between scanning for AMPS paging signals and scanning for CDPD indications results due to the aforementioned paging cycles for each. This is especially critical for the initial T203 time duration since a subscriber station will be de-registered with the CDPD system if it does not respond to an existing CDPD page during that time. However, if the subscriber station remains on the CDPD channel during the entire duration of the key 203 time period, the subscriber station is also liable to miss an incoming AMPS paging signal.

In order to avoid the possibility of missing an AMPS communication, the present invention switches modes to the AMPS control channel during the time frame designated by the T203 parameter (after a response to the polling RR signal sent by the subscriber station). The purpose of this shift from the CDPD mode to the AMPS mode is to remain away from the AMPS control channel for a total of less than approximately 3–5 seconds to avoid the risk of missing a re-transmission of an AMPS paging signal.

Assuming that a cell transfer has just been completed (in approximately one second in accordance with the CDPD Specification, Version 1.1, the part entitled "Radio Resource Management"), and that the CDPD network takes approximately 3 seconds to respond to the polling message sent by the subscriber station which has just completed the cell transfer, then an effective window of approximately 5 seconds exists for the subscriber station to change modes and monitor an AMPS control channel. There is the possibility of CDPD de-registration during the 5–10 seconds when the subscriber station is tuned to an AMPS control channel. However, this possibility is considered sufficiently small as to be practical within the context of this embodiment of the present invention.

After switching to the CDPD channel for the maximum time possible without missing an incoming AMPS paging message, the subscriber station will then switch back to the AMPS control channel (if no incoming data has been detected for the subscriber station on the CDPD channel after approximately 3 seconds). At this point, T204 timing becomes critical since de-registration and de-synchronization can occur if the subscriber station fails to detect a TEI notification message N times in a row (where N is the N204 parameter minus one). De-registration or de-synchronization must be avoided since the operation of registration and re-synchronization can take anywhere from 30 to 300 seconds. However, a time duration of between 30 and 90 seconds is more likely. In either case, substantial chance of losing incoming AMPS communication exists while the re-synchronization is being carried out. De-synchronization and de-registration will not occur if no data is being held for that particular subscriber station even if the subscriber station has not monitored the CDPD channel for N TEI notification periods. Normally, the mobile station could switch back from the AMPS channel to the CDPD channel 2 seconds or so before the end of the T204 time period to wait for the TEI notification message. If there is no indication of data for the subscriber station within approximately 5 seconds, the subscriber station will switch back to the AMPS control channel.

Because synchronization is so critical in order to carry out the mode switching of the present invention, a problem exists in that there is no way to be certain that the TEI notification messages will be exactly T204 seconds apart, since they can be buffered in the Mobile Data Base Station (MDBS) behind other data that is waiting to go out. Consequently, the operation of this embodiment of the present invention is predicated on the assumption that the TEI notification will not often be delayed more than 2 seconds from the time they are supposed to go out. Such a limitation will also aid in facilitating the MD-IS MDLP re-transmission timers which operate on the order of 5 seconds. Consequently, this limitation is viable in the operation of the CDPD system under the aforementioned administrative environment.

A special situation exists if a cell has more than one active CDPD channel stream. This is normally not the case. However, as demand for CDPD use grows, the situation will soon become a factor in the operation of any CDPD system, and will create a whole new set of problems. This is not a factor when a directed hop is performed by the subscriber station since the subscriber station is told precisely where to tune for the CDPD channel stream with which the subscriber station is associated. However, when an undirected hop occurs, it is necessary for the subscriber station to scan the active channels to locate the CDPD channel. Acquisition of the TEI notification message by the subscriber station is not a problem since synchronization with the T204 parameter already occurred when the subscriber station registered with the CDPD system. However, the TEI notification message is not necessarily in synchronization with the transmission of the channel stream identification number. This number is needed by the subscriber station to determine if the correct channel stream has been located.

If there is no immediate data message for a particular subscriber station upon receiving the TEI, the subscriber station has the option of waiting on the CDPD channel for the channel stream identification message, or switching modes to an AMPS channel to make certain that an AMPS page has not been missed. Normally, the channel stream identification message is sent once every 5 seconds while a typical AMPS page is carried out once every 4–10 seconds. Consequently, it may be necessary for the subscriber station to jump from the AMPS channel back to the CDPD channel several times to receive at least one channel stream identification message. Once such a message is received, the subscriber station ascertains whether that channel stream is already associated with the subscriber station. If not, the subscriber station sends a polled receiver/ready (RR) signal to the CDPD system indicating that the subscriber station has switched channel streams. If the CDPD system has buffered (usually for approximately 2 seconds) any incoming CDPD messages for that subscriber station on the other channel stream, they are transferred to the new channel stream sent to the subscriber station within the time frame defined by the parameter T203. Once again, the subscriber station is faced with the problem of staying on the CDPD channel for the entire duration of the T203 period, or jumping back to the AMPS control channel to check for incoming AMPS pages. Since synchronization exists with the T203 parameter, the subscriber station has the option of jumping to the AMPS channel, as previous described, and returning to the CDPD channel before the end of the T203 period to receive any incoming CDPD data messages. By performing this operation, the subscriber station runs a small risk of being de-registered on the CDPD system if any incoming data messages are missed during the time that the subscriber station is monitoring the AMPS control channel. The possibility is generally considered small enough to be worth risking for the sake of maintaining optimal AMPS operating efficiency. If there are no data messages waiting for the subscriber station during the T203 period, the absence of the subscriber station from the CDPD channel is unknown to the CDPD system and de-registration will not occur. For optimal performance (with respect to monitoring for AMPS communication) if the subscriber station determines that it has changed channel streams within the same cell, it should go back to the AMPS control channel for a minimum acceptable period before coming back to the CDPD channel and completing the channel hop by sending the polling RR message to the CDPD network.

When a subscriber station determines that a transfer is necessary in accordance with CDPD specification, Part 405, the subscriber station will tune back to the AMPS control channel for at least the interval between AMPS pages before coming back to the CDPD channel and carrying out the cell transfer algorithm. If a subscriber unit is "sleeping" (or monitoring on an AMPS control channel), there is normally no decision making to be made by the subscriber station with respect to hand-off. This is not a problem with the CDPD system, since there is no reverse channel interference. According to the CDPD specification on page 405–25, sleeping units do not run the RSSI scan procedure until they are ready to transmit. The only factor involved for a sleeping subscriber station is that it not move so far away from the cell site that it cannot reliably receive the TEI notification messages. This can be assured by checking block error rate criteria (BLER) while tuning to the CDPD channel to check for the TEI notification.

When a subscriber station completes a cell transfer, it sends a polling message to the CDPD network indicating that the subscriber station has changed channels. This polling message also indicates to the CDPD network that the subscriber station is "awake". Consequently, the subscriber station is supposed to stay "awake" on the CDPD control channel for at least T203 seconds after the subscriber station receives the CDPD network response to a polling message. Otherwise, if the serving MD-IS has data to deliver to the subscriber station before the subscriber station is expected to go back to the sleep mode, the MD-IS will attempt to deliver the waiting data immediately. If the attempt to deliver the subject data to the subscriber station is unsuccessful (because the subscriber station is no longer on the CDPD control channel), that subscriber station will be de-registered with the CDPD system. Thus, there is a strong motivation for the subscriber station to remain on the CDPD control channel for a minimum of 10 seconds as defined by the T203 parameter, especially if more than one CDPD channel stream exists for the new cell.

However, this time spent exclusively on the CDPD control channel clearly involves some risk of losing incoming AMPS calls, especially in an environment where cell transfers (which require that the aforementioned process to be carried out) are relatively frequent. Therefore, the subscriber station does not attempt to stay on the CDPD channel for 10 seconds (the T203 value). Rather, a subscriber station stays on the CDPD channel as long as it reasonably can before going back to the AMPS control channel to scan for AMPS paging signals directed to the subscriber station. By doing this the subscriber station runs only a small risk of deregistration on the CDPD network.

In order to allow as much time as possible to determine if data will be delivered to the subscriber station upon completion of cell transfer, cell transfer should take place as quickly as possible. Thus, it is necessary to keep the cell transfer data base up to date. Otherwise, the subscriber station will fall back into the initial acquisition of this data due to insufficient adjacent cell information. This is not a problem with initial registration and synchronization since enough time will be allowed for the cell transfer data base of the RRME to be constructed. However, it is a problem with cell transfer.

In accord with another aspect of the invention, upon cell transfer, the subscriber station alternates between the AMPS control channel and the CDPD control channel in a pattern that covers the entire RSSI scan interval as quickly as possible to rebuild the cell transfer data base from the cell configuration message scanned during the RSSI interval before the previous cell configuration data is deleted from the subscriber station.

Normally, the RSSI scan interval is between 30 and 120 seconds. The scan interval must encompass the entire cell configuration message needed to provide the data base for cell transfer. This information includes an indication of the existence of more than one CDPD data channel stream in use for a particular cell. Because of the necessity of switching to the AMPS mode periodically to check for AMPS paging messages, it is not feasible for the subscriber station to remain in the CDPD mode for the entire duration of the RSSI scan interval. Consequently, the subscriber station must switch back and forth between the CDPD and AMPS channels so that a plurality of RSSI scan periods are necessary in order to obtain the entire cell configuration data necessary for effective cell transfer. Because this process may take several minutes, and a moving vehicle containing the subscriber station may require frequent hand-off, it is necessary to retain cell configuration data of the previous cell in order to provide some information if a hand-off is needed before the cell configuration data set for the present cell is obtained by the subscriber station.

An additional factor is present by virtue of switching back and forth between the AMPS mode and the CDPD mode. A finite amount of time would be lost each time a mode switch takes place. The time needed to tune between the two channels plus the time needed for a complete maximum size frame to be received by a subscriber station is indicated as the parameter g. This is approximately 300 ms. As a result of this lost time, the RSSI scan interval would have to be received on a staggered basis by the subscriber station over a plurality of RSSI scan periods, as illustrated in the time chart of FIG. 6.

Figure 6:
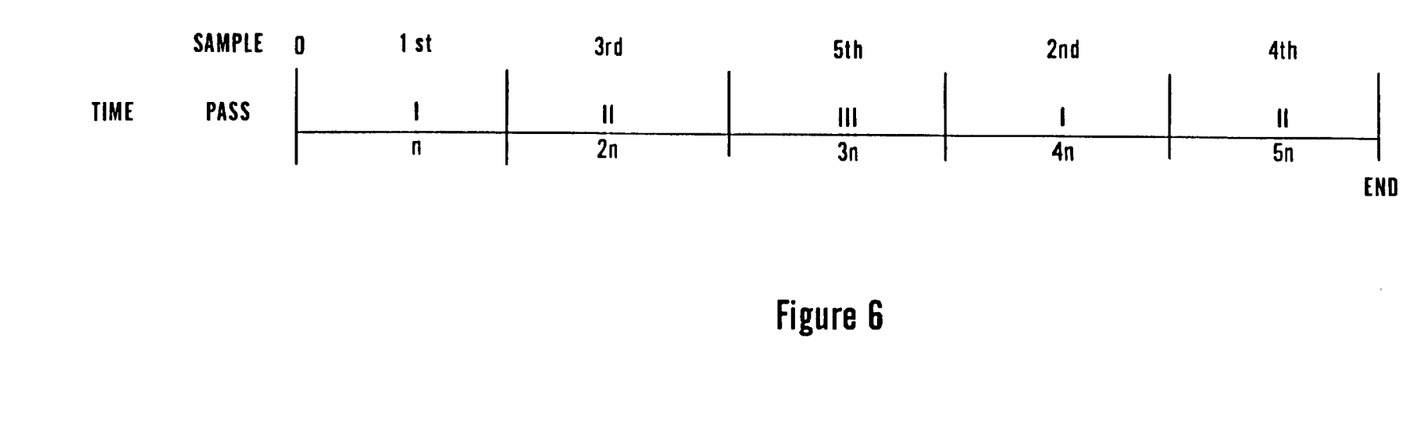
FIG. 6 is a time diagram depicting subscriber scanning during the RSSI interval.

As used in FIG. 6, the parameter n is the minimum time between AMPS pages. The parameter g is the guard time necessary to allow for tuning between the two modes. As long as the maximum time between AMPS pages is less than the quantity $2n-g$, it will be possible to cover the entire RSSI scanning interval in three passes. In order to do this, the RSSI scanner must be divided into even multiples of $2n$. Taking as an example a value of 4.5 seconds for n, g will be 200 ms and the quantity $2n-g$ will equal 8.7 seconds. These are typical values, as is the representative 90 second duration for the RSSI interval used in FIG. 6. In the first scanning slot (n) the subscriber station monitors the CDPD channel to obtain the information depicted in that time slot. Afterwards, the subscriber station switches back to monitor the AMPS control channel, for a period of time. After scanning the AMPS control channel, the subscriber station scans the CDPD channel during the 4n time slot and obtains the information regarding the cell configuration data contained therein. As the RSSI interval is repeated, the subscriber station takes a third pass in the time slot designated 2n before returning to the AMPS channel. After monitoring the AMPS channel, the subscriber station returns to the CDPD channel during the time slot designated 5n to collect the data contained therein. After the RSSI interval has elapsed the second time, the subscriber station remains on the AMPS control channel until the time interval 3n, during which the subscriber station collects the data contained therein. Since the RSSI scan interval is 90 seconds (a representative value typical in many CDPD systems) these three passes are necessary in order for the subscriber station to obtain the entire cell configuration message. As a result, approximately 4 minutes are needed for the entire cell configuration message to be obtained by the subscriber station.

Because of the possibility of de-registration from the CDPD system due to extended AMPS use, another feature of the invention provides a process of checking for CDPD registration periodically. Representative time periods vary from 5 minutes to 1 hour. However, other time periods could be used as deemed appropriate based upon the activity in both the CDPD and AMPS systems. During registration check, the subscriber station will remain tuned to the CDPD control channel during the entire duration of the time period defined by the T203 parameter. While this means that the subscribe station runs the risk of losing an AMPS communication during the time frame defined by the T203 parameter, this is an acceptable risk if conducted only once every 5–60 minutes. The risk is made more acceptable by the fact that if de-registration from the CDPD system occurs for the subject subscriber station, the re-registration process will entail a much greater risk of losing an incoming AMPS call directed to the subject subscriber station. In the alternative, the subscriber station can remain tuned to the CDPD channel as long as possible before switching back to the AMPS control channel in time to receive an incoming paging signal indicative of incoming AMPS communication. Thus, the subscriber station does not remain on the CDPD channel for the entire duration of the T203 time period. However, as previously explained, the subscriber station runs only a very small risk of deregistration from the CDPD system, or a loss of the proper CDPD data stream (if more than 2 CDPD data streams are used in the present cell).

To aid optimal performance of the aforementioned, the configuration timer (as described in the CDPD specification, Parts 406 and 507) should be set for a long duration, preferably an hour or more. A longer configuration time or duration period will result in fewer chances of losing incoming AMPS calls since the configuration timer will operate less often.

Although a number of arrangements of the present invention have been mentioned by way of example, it is not intended that the invention be limited thereto. For example, the present invention can be adapted for use with a variety of different parameter values and administrative environments. Also, the alternate mode to the CDPD mode need not be AMPS. Rather, other types of data communication can be selected. Accordingly, this invention should be considered to include any and all configurations, modifications, variations, combinations or equivalent arrangements falling within the scope of the following claims.

I claim:

1. A wireless subscriber station arranged for communication with a first communication system and a Cellular Digital Packet Data (CDPD) communication system, wherein said CDPD communication system includes first time adjustment means for selecting a first time interval (T204) between consecutive CDPD paging messages sent from said CDPD communication system to said wireless subscriber station, said wireless subscriber station comprising:

(a) means for requesting communication on said first communication system;

(b) means for requesting CDPD communication;

(c) second time adjustment means for selecting a second time interval (T203) starting at a most recent CDPD communication and ending when said wireless subscriber station is configured to enter a CDPD sleep mode;

(d) means for synchronizing said first and second time intervals to determine respective CDPD and first communication system operation schedules;

(e) means for selecting operation on said first communication system during said second time interval; and (f) means for alternating between control channels of said CDPD and first communication systems to receive cell configuration data.

2. The wireless subscriber station of claim 1, wherein said first communication system is constituted by an Advanced Mobile Phone Service (AMPS).

3. The wireless subscriber station of claim 2, further comprising:

(f) means for requesting a value for a parameter N204 wherein product of a parameter (N204) and the first time interval defines a time duration allowed before de-registration of said wireless subscriber station.

4. The wireless subscriber station of claim 3, wherein said parameter (N204) equals 5.

5. The wireless subscriber station of claim 2, wherein said second time adjustment means operates in response to an amount of AMPS activity conducted by said wireless subscriber station.

6. The wireless subscriber station of claim 2, wherein said means for selecting operation tunes to an AMPS control channel after said second time period has elapsed.

7. The wireless subscriber station of claim 3, further comprising means for calculating an overall time duration based upon a product of said parameter (N204) and said first time interval (T204), wherein said means for selecting operation tunes said wireless subscriber station to a CDPD channel at least once before the expiration of said overall time duration.

8. The wireless subscriber station of claim 7, further comprising:

(g) means for scanning CDPD activity and AMPS activity.

9. The wireless subscribe station of claim 8, further comprising:

(h) a cell transfer database based upon information accumulated by said means for scanning.

10. A wireless subscriber station arranged for communication with a first communication system and a Cellular Digital Packet Data (CDPD) communication system, wherein the CDPD communication system includes first timer means for measuring a first time interval (T204) specifying the time between consecutive CDPD paging messages sent from said CDPD communication system to said wireless subscriber station, and second timer means for measuring a second time interval (T203) specifying the time between a CDPD system response to a polling signal from said subscriber station and expected entry of the subscriber station into a CDPD sleep mode, said wireless subscriber station comprising:

(a) means for requesting communication on said first communication system;

(b) means for requesting CDPD communications;

(c) means for measuring said first and second time intervals;

(d) means for synchronizing the duration of said first and second time intervals with said CDPD communication system;

(e) means for determining respective CDPD and first communication system operation schedules for said subscriber station based upon said first and second time intervals and a paging cycle of said first communication system;

(f) means for selecting operation of one or the other of said means for requesting communication based upon said operating schedules to scan for incoming paging signals on said first communication system while continuing to be registered on said CDPD system; and (g) means for scanning alternately AMPS and CDPD activity.

11. The wireless subscriber station of claim 10, wherein said first communication system is constituted by an Advanced Mobile Phone Service (AMPS).

12. The wireless subscriber station of claim 11, further comprising:

(i) means for scanning AMPS and CDPD activity.

13. The wireless subscriber station of claim 12, further comprising:

(j) a cell transfer database constituted by data accumulated by said means for scanning.

14. The wireless subscriber station of claim 13, further comprising:

(k) means for negotiating a value of said first time interval with said CDPD communication system.

15. The wireless subscriber station of claim 14, wherein said first time interval is negotiated to a value of 10 seconds.

16. A method for operating a wireless subscriber station in a Cellular Digital Packet Data (CDPD) communication system, comprising the steps of:

(a) selecting at said wireless subscriber station a first time interval (T203) beginning at the completion of a most previous CDPD communication between said subscriber station and said CDPD system and ending when said subscriber station is configured to enter a CDPD sleep mode;

(b) synchronizing said wireless subscriber station with said CDPD communication system so that said subscriber station measures a plurality (N204) of second time intervals (T204) along with said CDPD system, wherein said second time intervals selected by said CDPD system define a duration of time allowed to said subscriber station before de-registration of said wireless subscriber station;

(c) monitoring at said subscriber station for incoming paging signals on a second communication system during said first time interval;

(d) monitoring at said subscriber station for incoming paging signals on said second communication system during said plurality of said second time intervals; and (e) changing modes at said subscriber station to monitor for incoming CDPD communication on a CDPD channel before expiration of the last of said plurality of said second time intervals.

* * * * *